June 17, 1930.    E. FALKENTHAL    1,764,250
SEPARATING AND MIXING APPARATUS
Filed Oct. 4, 1923
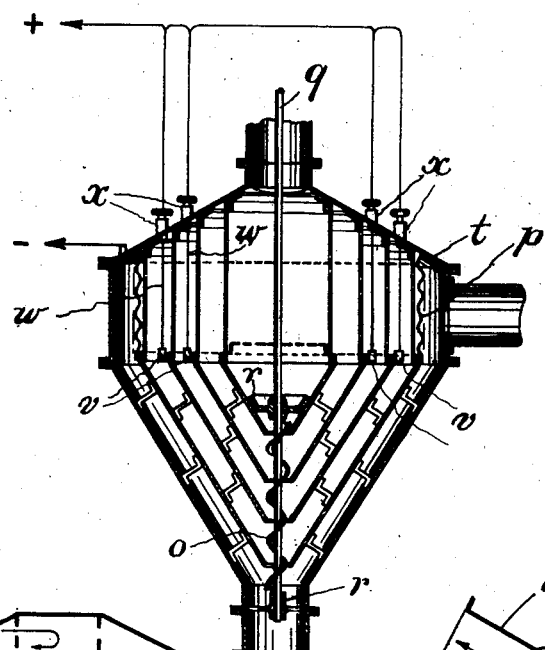
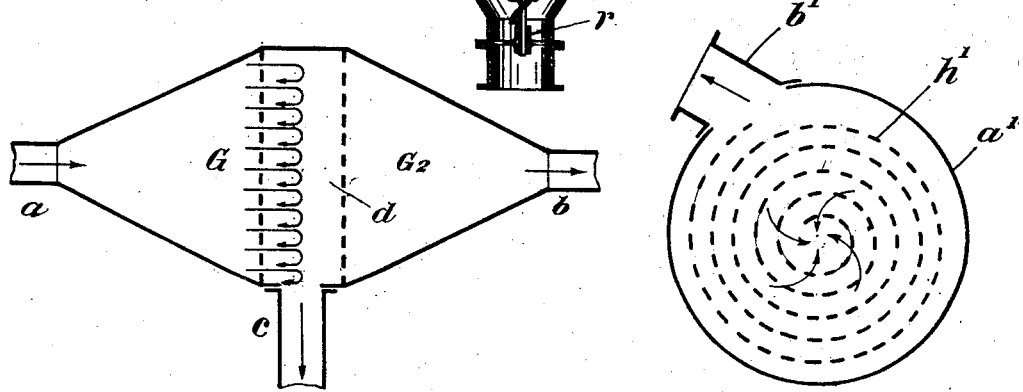
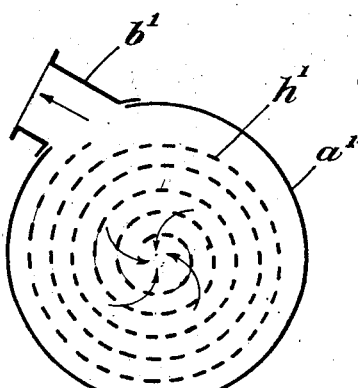
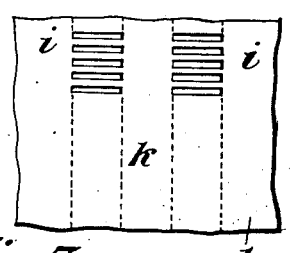
Inventor
Erwin Falkenthal
by Henry Orth
Atty Patented June 17, 1930

1,764,250

UNITED STATES PATENT OFFICE

ERWIN FALKENTHAL, OF BERLIN-DAHLEM, GERMANY

SEPARATING AND MIXING APPARATUS

Application filed October 4, 1923, Serial No. 666,608, and in Germany April 23, 1921.

This invention relates to separating apparatus, and more particularly to apparatus for separating foreign particles from a flowing stream, such as air, gases or vapors, or liquid, and collecting the same for the purpose of purifying the said stream, and for avoiding loss of valuable substances in industrial processes.

The invention has for its object a separation of a novel kind, whereby the foreign particles suspended in a flowing stream are settled without the aid of filtering water, as heretofore used in separating dust from air or gas, and without precipitating water, as heretofore used in separating oil from vapor, but only by leading-in the stream with a low speed of flow, for instance of about 1 mm. per sec., into a compartment closed by a very thin vertical grid, and passing the said stream with the particles suspended therein through the said grid and through a whirling-zone which is produced on the rear side of the grid, the dust settling action not taking place on the front side of the grid but on the rear side thereof within the whirls of the said whirling-zone. The separated matter is in all cases not water, but a solid, or another liquid.

For producing the said whirling-zone the grid is formed of a thin sheet, preferably of metal, and is provided with numerous openings which have no projecting sharp edges and a minimum dimension of about three to ten times the grid's thickness; these openings, further, having a distance apart from each other equal to the said maximum dimension of an opening, and therefore each producing a flat whirling behind itself on the rear side of the grid. In consequence of this arrangement the rear side of the grid is covered with numerous confining whirls which have a uniform distribution corresponding to the distribution of the grid openings and forming a flat whirling zone wherein the settling effect takes place.

To ascertain whether the whirls are produced in the desired scope, a sample of the grid intended to be used is placed with its rear side near a flame. On the stream passing through the grid the flaring flame should show a distinctly defined whirling zone at the rear of the grid, which is confined sharply to a slow stream going away from the grid. In the case of liquids the whirling effect can be observed by means of admixtures of color or powder.

An effective grid for the purpose of this invention can, for example, be produced by punching or boring holes in a metal sheet, while a web woven of round wire would be entirely ineffective. However, a round wire grid can be adapted for the purpose of this invention by flattening the same by rollers to produce sharp edged meshes. It is to be noted that the openings must not have the form of channels whose length exceeds their diameter, or of funnels whose diameter decreases toward one end thereof.

In practice the openings in the grid will have a minimum diameter of about 0.3 mm. in a sheet of about 0.03 mm. thickness up to a minimum diameter of about 3 mm. in a sheet of about 1 mm. thickness.

The distance apart from each other of the openings must be such that there exists between adjacent openings a solid imperforate grid-area substantially equal to the area of one adjacent opening. According to this principle, in the case of slit-like and parallel arranged openings, the solid strip between each two slits must be at least as broad as the width of a slit.

For the purpose of the invention the width of the sharp-edged openings of the grid must be such that the grains of dust (or drops of oil or the like) are not obstructed in their passage through the openings or meshes. The width of the openings may amount to 50–100 times the size of the grains or drops. An opening greater than about 10 mms. will hardly ever be necessary. A greater speed of flow will generally require a smaller width of opening.

In the whirls, which form chiefly at the rear of the grid, but also to a smaller degree at the front of the same, an agglomeration of the dust suspended in the flowing substance of the stream takes place, so that it is caused to drop by gravity, and to accumulate at the bottom of the casing. Some of the dust particles impinge upon the lands between the openings in the grid, and accumulate there until they drop automatically or are removed by suitable instruments, such as brushes, scrapers, vibrators or the like, or by washing or sprinkling. The agglomeration of the particles seems to be accompanied by electrical effects, for it is observed that the grids become charged with electricity. Apparently the friction of the dust particles against the sharp edges of the openings and their mutual friction in the whirls cause the particles to be electrically charged.

The total area of the openings of the grid depends upon the speed of the flowing stream sent through it, and should be such that a throttling action or an obstruction of flow is avoided as much as possible. By increasing the cross-sectional area of the casing in comparison with the cross section of the leading-in pipe by which the stream is conducted into the casing the speed of flow at the grid can be reduced to any desired extent. It has been found in practice that in most cases the most favorable results are obtained at a speed of one meter per second. At this speed the difference of pressure between the front and rear sides of the grid with slit-shaped openings 1 mm. in width and which occupy about one-third of the grid's surface, corresponds to a pressure of a column of water not over 1 to 2 mm. high. A grid of this kind used for the separation of dust extracts about 35% of the dust, such as lime particles, suspended in flowing air. If four grids of this kind are placed one behind the other the amount of dust particles extracted is 90% or more.

The percentage of dust or moisture particles separated at a grid depends largely upon the number of whirl-producing edges of the openings present in a unit of surface. For this reason the openings are preferably formed as above mentioned, in the shape of narrow slits of a width of one-half to ten mms. arranged parallel to each other. Round openings are generally not quite as effective, slit formed openings being the kind preferred for the extraction of fine dust. Dust of the kind which could not be extracted hitherto by means of known forms of dust extractors, such as brown coal or calcareous dust, can be extracted by grids according to this invention provided with slit-shaped openings.

The grid is to be arranged in a vertical position and the slits are preferably disposed in vertical rows. The solid grid-area left between the rows of slits will then form quiescent precipitating zones at the rear of the grid for the dust that passes out from the whirling zones.

When several grids are arranged behind one another, the free space left behind each grid may be reduced so that it is only sufficient to provide room for the whirling zones, or order to reduce the length of the separating apparatus as far as possible. The width of the free space behind each grid depends upon the size of the openings and ranges from 2 to 10 cms. The number of grids arranged one behind another for the purpose of separating the greatest possible amount of foreign particles will increase with the speed of flow and the width of the slits compared to the size of the particles to be extracted. When a plurality of grids are placed behind one another the openings in the different grids need not differ in size because, in the devices according to this invention, it is not a question of sifting out particles of increasing fineness. The number of openings in the different grids may, however, increase from the first to the last grid while their size decreases, so that the total area of the openings on each grid is the same.

A particular advantage of this invention is that large pacifying spaces are not required, as in known dust separators, in which the dust is allowed to sink automatically, and for this reason the novel separators according to this invention are to be preferred wherever separators of the ordinary kind would take up too much space.

The effect of separators with a plurality of grids is so great that it is even possible to separate particles of microscopic fineness, such as dust of lime, brown coal, cement, dyes, etc., the quantity separated amounting to almost 100%.

With my novel apparatus it is also possible to separate fine quartz sand from oil obtained from oil wells, or to extract oil from the waste steam of steam engines.

In the case of gases or liquids which attack metal the grid is made from bakelite or similar artificial substances which permit of sharp edged openings being made therein. The openings are produced by stamping, milling or drilling.

The dust separating effect my be further intensified by charging the grids with electricity as in the Cottrell process, this device being particularly applicable in the case of air containing only a little dust. This method is also particularly advantageous when dust injurious to health or dust containing valuable solids is to be dealt with. A substitute for electrically charging the grid consists in the use of a filtering cloth placed around the last grid in a series, which cloth only serves to remove the last traces of dust, and therefore remains effective for a long time.

In some cases it will be found advantageous to moisten the dust separating grid with oil or other adhesive substances in order to catch the finest dust.

In the apparatus for separating dust or moisture the stream is conducted into one end of the grid container and let out from the other. The dust or condensed moisture is deposited in the individual compartments between the grids from which it is removed from time to time by opening the apparatus, or continually conducting it off.

Another field of application is in the production of dried egg or milk. Hot air containing sprayed milk or egg is guided through the grid and dried substance is separated on the rear side of the grid.

The invention is illustrated in the accompanying drawing, in which—

Figure 1 shows my dust separator of the simplest form.

Fig. 2 illustrates a dust separator of a combined grid arrangement with dust-removing fittings and loading electrodes.

Fig. 3 is a fragment of a grid from the dust remover of Fig. 1 or 2 in natural size.

Fig. 4 is a cross section of the dust remover according to Figure 2.

The apparatus shown in Fig. 1 consists of a casing in the form of two frustums connected at their widest parts by a short cylinder, the narrow ends of the frustums having pipes $a$, $b$, and the middle cylindrical portion being fitted with a pipe $c$. At both ends of the cylindrical portion grids $G^1$, $G^2$ are placed. The air or gas to be purified is led in through the pipe $a$ and the purified air or gas is let off through the pipe $b$. The passage of the air or gas through the grid $G^1$, causes them to form whirls in the cylindrical portion of the casing behind the grid $G^1$. The dust settled within these whirls is drawn off periodically or continually through the pipe $c$.

Fig. 2 illustrates a dust remover consisting of a hollow cylinder $a$ which is provided with a lateral pipe $b$ and fitted at the top $t$ and bottom with hollow truncated cones $d$, $e$ to which are connected pipes $f$, $g$. The casing contains four curved grid-walls $h$ formed by the windings of a spirally wound grid-band, for instance as is shown in Fig. 4. The grid walls have vertical rows of slits, as shown in Fig. 3. The land $k$ between the slits is about equal in width to the length of a slit, so that the surface area of a row of slits is about equal to the area of the land $k$ between the rows. The land or unperforated strip may generally be made somewhat wider say up to 1. 5 the width of a row of slits. The dust separator illustrated may be used for separating calcium nitrate or nitrite, for example.

At their bottom edges the grid-walls are attached to hollow frustums $m$ upon which the dust collects and slides downwards. These frustums $m$ prevent the air current from evading the grids. The frustums may also be perforated in order to equalize the accumulation of dust upon them.

Dust-laden air is injected through the pipe $f$ and passes through the grid-walls one after the other, as indicated by the arrows, the air being thus caused to deposit its dust, which latter falls through the pipe $g$ into a dust collector, whilst the purified air is conducted off through a pipe $b$. A grid $n$, also slitted as indicated in Fig. 3 prevents the current of air which is injected at $f$ from whirling up the dust that slides down in the frustums $m$. In the space between the frustums $m$ there is arranged a conveyor worm $o$, for preventing clogging in cases where dust is deposited in large quantities. The bearings for the worm are indicated at $r$. The worm $o$ is motor-driven by shaft $q$ which is held in bearings $r$ of suitable spiders, giving a broad passage for the dust. The outermost grid is surrounded by a filtering cloth $p$ of the kind hereinbefore mentioned.

In Fig. 2 the height of the cylindrical grids increases as their diameter decreases. It is advantageous to make this increase such that all the grids will have substantially the same area. This is for the purpose of making the speed of flow at the grids of different diameter approximately equal, which in certain cases tends to improve the dust separating effect.

In Fig. 2 is also shown a set of electrodes consisting of wires $w$ which depend from the cover $t$ of the apparatus and are held straight by weights $v$. The wires are insulated from the cover $t$ by insulating knobs $x$, and, as indicated, are all connected with the positive side of a battery, the negative side of the same being connected with the cover $t$. These electrodes are arranged for the purpose of creating an electrostatic dust-settling field, as already stated.

Between the windings of the spiral grid (Fig. 2), brushes may be arranged for the purpose of preventing clogging of the grids. In the interior of the innermost grid a stirring device may be arranged, which is adapted to pass on the dust that collects there to the conveyor worm.

It is thus seen that by an appropriate application of the invention, apparatus can be constructed by which gases or liquids containing foreign particles in suspension may be perfectly separated and purified in a simple and highly efficient manner.

I claim:—

1. In an apparatus for settling foreign particles of dust-size from flowing matter, in combination: a compartment arranged for being passed through by the flowing matter, a vertical grid forming a wall of said compartment and arranged for being passed through by the same flowing matter, the grid consisting of a very thin sheet, preferably of metal, and having numerous equally sized sharp edged openings, said openings having no projecting sharp edges and being a distance apart from each other equal with the minimum dimension of an opening, said distance being measured in the direction of said dimension, the grid being thus enabled for producing on its rear side a whirling zone of uniform thickness in the flowing matter, means being provided for collecting the foreign particles falling down behind the said grid from the said whirling zone.

2. In an apparatus for settling foreign particles of dust-size from flowing matter, in combination: a compartment arranged for being passed through by the flowing matter, a vertical grid forming a wall of said compartment and arranged for being passed through by the same flowing matter, the grid consisting of a very thin sheet, preferably of metal, and having numerous slit-formed, equally sized, sharp edged openings, these slits being disposed parallel with one another in vertical rows which are separated by solid strips of grid area, the said slits having a minimum dimension of about two to ten times the thickness of the sheet and having no projecting edges, the distance apart between each two slits in the same row being equal to the minimum width of a slit, the grid being thus enabled for producing on its rear side a whirling zone in the flowing matter, means being provided for collecting the foreign particles falling down in quiet zones which exist behind the said solid area strips.

3. In an apparatus for settling foreign particles of dust-size from flowing matter; a plurality of wall portions arranged for being passed through in series by the flowing matter and consisting of portions of a vertical grid, the grid consisting of a very thin sheet, preferably of metal, and having numerous equally sized sharp edged openings with a minimum dimension of about two to ten times the thickness of the sheet, the said openings having no projecting edges, and the distance apart of the openings from each other being equal with the said minimum dimension measured in the direction of said dimension, the grid being thus enabled for producing on its rear side a whirling zone in the flowing matter, means being provided for collecting the foreign particles falling down behind said grid from the said whirling zones.

4. In an apparatus for settling foreign particles of dust-size from flowing matter; a vertical, spiral grid, the grid decreasing in height from the first to the last turn and consisting of a very thin sheet, preferably of metal, and having numerous equally sized sharp edged openings with a minimum dimension of about two to ten times the thickness of the sheet, the said openings having no projecting edges and the distance apart from each other being equal to the said minimum dimension of an opening measured in the direction of said dimension, said grid being thus enabled for producing on its rear side a whirling zone in the flowing matter, means being provided for collecting the foreign particles falling down behind the said grid from the said whirling zones.

5. In an apparatus for settling foreign particles of a dust-size from flowing matter; a vertical, spiral grid, the said grid and spaces between its turns being arranged for being passed through in series from inwardly to outwardly, or vice versa, by the flowing matter, the said grid consisting of a very thin sheet, preferably of metal, and having numerous equally sized sharp edged openings with a minimum dimension of about two to ten times the thickness of the sheet, the said openings having no projecting edges and being a distance apart from each other equal with said minimum dimension of an opening measured in the direction of said dimension, said grid being thus enabled to produce on its rear side a whirling zone in the flowing matter, frustum-shaped walls extending from the bottoms of said turns of the grid, and a conveyor worm arranged within the axis of the spiral for conducting away the foreign particles falling down from the whirling zones.

6. In an apparatus for settling foreign particles of dust-size from flowing matter; a vertical, spiral grid, said grid consisting of a very thin sheet, preferably of metal, having numerous equally sized sharp edged openings with a minimum dimension of about two to ten times the thickness of the sheet, the said openings having no projecting edges and being a distance apart from each other equal to the said minimum dimension measured in the direction of said dimension, the grid being thus enabled to produce on its rear side a whirling zone in the flowing matter, means being provided for collecting the foreign particles falling down behind the said grid from the said whirling zones, a plurality of electrodes being arranged in each of the spaces between adjacent turns of the spiral for creating electrostatic dust settling fields.

In testimony whereof I have affixed my signature.

ERWIN FALKENTHAL.